US012560451B2

(12) United States Patent
Wagner

(10) Patent No.: US 12,560,451 B2
(45) Date of Patent: Feb. 24, 2026

(54) METHOD FOR POSITIONING A MAP REPRESENTATION OF AN ENVIRONMENT OF A VEHICLE IN A SEMANTIC ROAD MAP

(71) Applicant: Robert Bosch GmbH, Stuttgart (DE)

(72) Inventor: Andre Wagner, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 79 days.

(21) Appl. No.: 18/685,443

(22) PCT Filed: Aug. 2, 2022

(86) PCT No.: PCT/EP2022/071629
§ 371 (c)(1),
(2) Date: Feb. 21, 2024

(87) PCT Pub. No.: WO2023/030802
PCT Pub. Date: Mar. 9, 2023

(65) Prior Publication Data
US 2024/0353235 A1 Oct. 24, 2024

(30) Foreign Application Priority Data

Sep. 6, 2021 (DE) ..................... 10 2021 209 786.3

(51) Int. Cl.
*G01C 21/00* (2006.01)

(52) U.S. Cl.
CPC ...... *G01C 21/3811* (2020.08); *G01C 21/3837* (2020.08)

(58) Field of Classification Search
CPC ......................... G01C 21/3837; G01C 21/3811
See application file for complete search history.

(56) References Cited

U.S. PATENT DOCUMENTS 11,761,780 B1 * 9/2023 Duenas Arana ..... G01C 21/387
701/533
2018/0268566 A1 * 9/2018 Houts ..................... G01S 17/86
(Continued)

FOREIGN PATENT DOCUMENTS

CN       111598916 A       8/2020
DE   102019101938 A1       8/2019
(Continued)

OTHER PUBLICATIONS

International Search Report for PCT/EP2022/071629, Issued Dec. 7, 2022.

*Primary Examiner* — Adnan M Mirza
(74) *Attorney, Agent, or Firm* — NORTON ROSE FULBRIGHT US LLP

(57) ABSTRACT

A method for positioning a map representation of an environment of a vehicle in a semantic road map. The method includes creating a map representation of an environment of the vehicle based on environmental sensor data; ascertaining characteristic elements in the map representation and in a semantic road map representing the environment; comparing the characteristic elements of the map representation to the characteristic elements of the semantic road map; ascertaining a portion of the semantic road map for which at least one characteristic element of the portion of the semantic road map matches at least one characteristic element of the map representation and for which the map representation and the semantic road map describe an identical region of the environment of the vehicle; and identifying a position of the portion within the semantic road map as the position of the map representation in the semantic road map.

12 Claims, 4 Drawing Sheets

(56) References Cited

U.S. PATENT DOCUMENTS

| | | | |
|---|---|---|---|
| 2020/0098135 A1* | 3/2020 | Ganjineh | ........... G01C 21/3811 |
| 2020/0240793 A1 | 7/2020 | Li et al. | |

FOREIGN PATENT DOCUMENTS

| | | |
|---|---|---|
| DE | 102018207588 A1 | 11/2019 |
| DE | 102019124566 A1 | 3/2021 |
| DE | 102019216722 A1 | 5/2021 |
| DE | 102019217555 A1 | 5/2021 |
| DE | 102021104044 A1 | 8/2021 |
| EP | 3505869 A1 | 7/2019 |
| EP | 3992922 A1 | 5/2022 |
| JP | 2018522345 A | 8/2018 |
| JP | 2019139400 A | 8/2019 |
| JP | 2020533601 A | 11/2020 |
| WO | 2020076610 A1 | 4/2020 |

* cited by examiner

Fig. 5

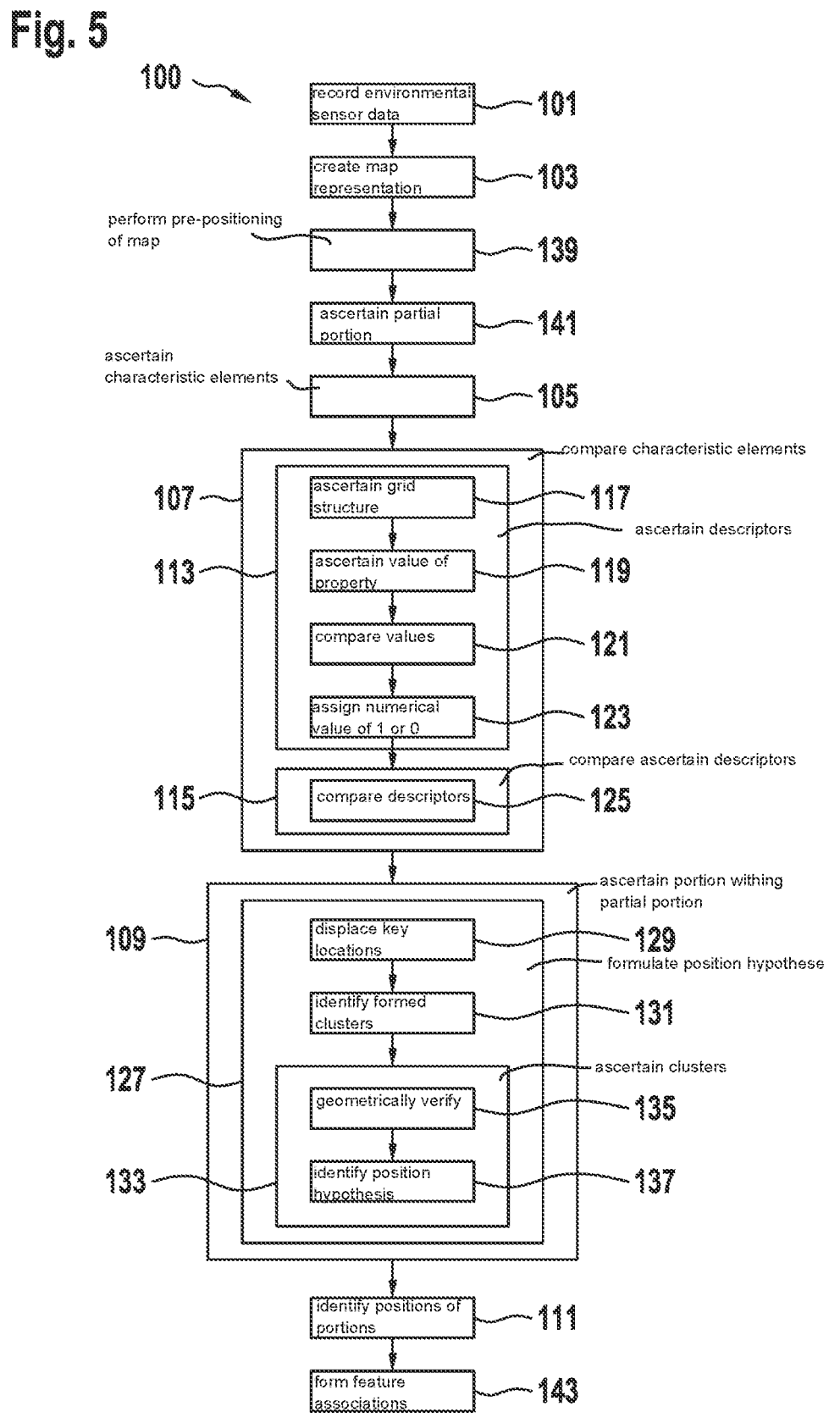

100 record environmental sensor data — 101 create map representation — 103 perform pre-positioning of map — 139 ascertain partial portion — 141 ascertain characteristic elements — 105 compare characteristic elements

107 ascertain grid structure — 117 ascertain descriptors

113 ascertain value of property — 119 compare values — 121 assign numerical value of 1 or 0 — 123 compare ascertain descriptors

115 compare descriptors — 125 ascertain portion withing partial portion

109 displace key locations — 129 formulate position hypothese identify formed clusters — 131

127 ascertain clusters geometrically verify — 135

133 identify position hypothesis — 137 identify positions of portions — 111 form feature associations — 143

600 position map representation ~601 integrate information of map representation ~603 storage medium

701~ computer program ~700

METHOD FOR POSITIONING A MAP REPRESENTATION OF AN ENVIRONMENT OF A VEHICLE IN A SEMANTIC ROAD MAP

FIELD

The present invention relates to a method for positioning a map representation of an environment of a vehicle in a semantic road map.

BACKGROUND INFORMATION

For the precise control of vehicles, in particular of autonomously driving vehicles, detailed map representations of the environment of the vehicle to be controlled are needed. For this purpose, data of the environment can be recorded during driving of the vehicle or during test drives of vehicles for this purpose and semantic road maps based on these data can be created with semantic information regarding the environment. However, such road maps must be continuously kept up-to-date and must be provided with additional details.

SUMMARY

It is an object of the present invention to provide an improved method for positioning a map representation of an environment of a vehicle in a semantic road map.

This object is achieved by the method for positioning a map representation of an environment of a vehicle in a semantic road map of the present invention. Advantageous embodiments of the present invention are disclosed herein.

According to an aspect of the present invention, a method for positioning a map representation of an environment of a vehicle in a semantic road map is provided. According to an example embodiment of the present invention, the method includes:

receiving environmental sensor data of at least one environmental sensor of a vehicle;

creating a map representation of an environment of the vehicle on the basis of the environmental sensor data of the vehicle;

ascertaining characteristic elements in the map representation and characteristic elements in a semantic road map representing the environment;

comparing the characteristic elements of the map representation to the characteristic elements of the semantic road map;

ascertaining a portion of the semantic road map for which a plurality of the characteristic elements of the portion of the semantic road map matches a plurality of the characteristic elements of the map representation and for which the map representation and the semantic road map describe an identical region of the environment of the vehicle; and identifying a position of the portion within the semantic road map as the position of the map representation in the semantic road map.

This can achieve the technical advantage that an improved method for positioning a map representation of an environment of a vehicle in a semantic road map can be provided. To this end, a map representation of the environment of the vehicle represented by the environmental sensor data is created on the basis of environmental sensor data of at least one environmental sensor of a vehicle. The map representation may in this case be limited to the immediate environment of the vehicle and depicts the objects arranged in the environment. For positioning the map representation, characteristic elements within the map representation and characteristic elements within the semantic road map are ascertained thereafter. The characteristic elements may, for example, be objects that are arranged in the environment and via which a characteristic description of the environment is made possible. The characteristic elements can, for example, be formed by roadway markings or road signs within the environment. Such objects are stored as characteristic elements including semantic descriptions in the semantic road map.

For ascertaining the position, the characteristic elements of the map representation are compared to the characteristic elements of the road map and a portion within the semantic road map is ascertained. The position of the portion within the semantic road map is furthermore identified as the positioning of the map representation within the semantic road map. The portion may indicate dimensions corresponding to the dimensions of the map representation.

The semantic road map within the meaning of the application is a digitalized road map with semantic information regarding the objects depicted by the road map.

According to one embodiment of the present invention, comparing the characteristic elements comprises:

ascertaining descriptors for key locations of each characteristic element of the semantic road map and descriptors for key locations of each characteristic element of the map representation; and comparing the descriptors of the key locations of the semantic road map to the descriptors of the key locations of the characteristic elements of the map representation, wherein characteristic elements match if the descriptors of the key locations of the respective elements match.

This can achieve the technical advantage that, through the descriptors of the characteristic elements and by comparing the descriptors of various characteristic elements, a precise comparison between various characteristic elements of the semantic road map and of the map representation is made possible.

Within the meaning of the application, characteristic elements in the map representation match characteristic elements in the semantic road map if the characteristic elements in the respective maps originate from the same semantic class and are positioned in the respective maps at comparable locations.

According to one embodiment of the present invention, determining a descriptor of a characteristic element comprises:

determining a geometric grid structure of the descriptor at a position of the key location of the respective characteristic element within the map representation or within the semantic road map, wherein the geometric grid structure comprises a plurality of adjacent spatial regions;

ascertaining, for each spatial region of the grid structure, a property of the respective characteristic element;

comparing values of the properties within a spatial region to values of the property for spatial regions of the geometric structure that are directly adjacent to the spatial region; and assigning a numerical value 1 to a spatial region of the grid structure if the value of the property in the respective spatial region is greater than values of the property in directly adjacent spatial regions, and assigning a numerical value 0 to a spatial region if the value of the property in the spatial region is not greater than values of the property in the directly adjacent spatial regions.

This can achieve the technical advantage that a detailed and unambiguous descriptor can be provided. The descriptor is designed as a neighbor binary landmark descriptor for this purpose. The descriptor designed in this way makes an unambiguous description of various characteristic elements of both the map representation and the semantic road map possible.

Alternatively, a descriptor without a neighborhood comparison may also be used, in which no comparison of adjacent spatial regions is carried out.

According to one embodiment of the present invention, comparing the descriptors comprises:

performing a next neighbor search for the descriptors on a k-dimensional tree.

This can achieve the technical advantage that a precise comparison of various descriptors of the semantic road map and of the map representation is made possible.

According to one embodiment of the present invention, descriptors for characteristic elements of various semantic classes are determined, wherein only descriptors of characteristic elements of a same semantic class are compared to one another.

This can achieve the technical advantage that the comparison of the descriptors of various characteristic elements can be made more precise. By adding the semantic information regarding the characteristic elements, it can be achieved that the comparison of the characteristic elements and thus the positioning of the map representation in the semantic road map is made more precise.

According to one embodiment of the present invention, the semantic classes of the characteristic elements comprise: roadway markings, roadway boundaries, street lights, traffic lights, traffic signs.

This can achieve the technical advantage that various objects that are commonly found in the environment of a vehicle can be taken into account in the positioning of the map representation in the semantic road map. This can make the positioning more precise. The roadway markings taken into account may include solid or dashed lines in a white or yellow color.

According to one embodiment of the present invention, the property is one from the following list: a point density of points within the spatial region, a length of a characteristic element depicted as a line within the spatial region, a surface area of a characteristic element depicted as a surface within the spatial region, a volume of a characteristic element depicted as a volume within the spatial region.

This can achieve the technical advantage that, as a function of the geometric properties of the characteristic elements, corresponding properties are taken into account in the descriptor. As a result, various geometrically formed characteristic elements can be taken into account by the descriptor, whereby the positioning of the map representation relative to the semantic road map can be made more precise due to the increased number of characteristic elements available for the comparison. For calculating the descriptors, a corresponding section, comprising a characteristic element, of the map representation or of the semantic road map can be rotated about the respective key location for which the descriptor is to be calculated, on the basis of the average directions of the roadway marking. The section may be circular, for example. The rotation can be carried out until the map representation coincides with the semantic road map. The rotation thus makes it possible to compare maps that are rotated relative to one another. This can achieve a rotational invariance of the method.

According to one embodiment of the present invention, ascertaining the portion comprises:

formulating a plurality of position hypotheses of possible positions of the map representation within the semantic road map, wherein formulating the position hypotheses comprises:

performing a position translation of the key locations of the characteristic elements in the semantic road map whose descriptors match descriptors of characteristic elements of the map representation, within the semantic road map by distances that correspond to distances in the map representation of the respectively corresponding characteristic elements of the map representation from a center point of the map representation;

identifying positions of the clusters as position hypotheses for the map representation; and verifying the position hypotheses as the position of the portion; wherein verifying comprises:

ascertaining numbers of key locations displaced to centers of the clusters, and identifying the cluster with the largest number of key locations displaced to the center of the cluster, as the position hypothesis of the portion with a greatest match to the map representation; or representing the map representation in the semantic road map according to the position hypotheses, comparing the characteristic elements at the position of the position hypothesis to the characteristic elements of the map representation represented at the position of the position hypothesis, and identifying the position hypothesis with a largest number of matching characteristic elements.

This can achieve the technical advantage that for the positioning of the map representation relative to the semantic road map, a plurality of position hypotheses can be formulated. The plurality of position hypotheses can make the actual positioning of the map representation more precise. The position hypothesis that represents the correct position of the map representation relative to the semantic road map with the greatest probability is thus selected in a selection method. In this case, the selected position hypothesis corresponds to a portion in the semantic road map that has the most characteristic elements matching the characteristic elements of the map representation.

Within the meaning of the application, descriptors of characteristic elements match if the descriptors have a similarity.

According to one embodiment of the present invention, comparing the characteristic elements at the position of the position hypothesis to the characteristic elements of the map representation represented at the position of the position hypothesis comprises performing a RANSAC algorithm.

This can achieve the technical advantage that a precise comparison of the characteristic elements and a precise determination of a greatest match can be achieved in that outlier values of the characteristic elements, in particular with respect to their positioning within the semantic road map, can be eliminated by performing the RANSAC algorithm and can remain unconsidered in the comparison.

According to one embodiment of the present invention, the method furthermore comprises:

performing a pre-positioning of the map representation relative to the semantic road map on the basis of a geoposition of the environment of the vehicle that is depicted by the map representation; and ascertaining a partial portion of the semantic road map on the basis of the ascertained geoposition, wherein the characteristic elements of the semantic road map within the partial portion are determined.

This can achieve the technical advantage that a simplification of the positioning of the map representation relative to the semantic road map is made possible. Via the pre-positioning on the basis of the geoposition of the environment represented by the environmental sensor data of the environmental sensor of the vehicle, the semantic road map for comparing the characteristic elements can be reduced to a partial portion comprising the geoposition of the environment of the vehicle. This can simplify the comparison process of the characteristic elements of the map representation and the characteristic elements of the semantic road map in that only characteristic elements of the semantic road map that are arranged in the partial portion arranged around the geoposition are taken into account.

According to one embodiment of the present invention, the method furthermore comprises:

forming feature associations between features of characteristic elements of the semantic road map and features of characteristic elements of the map representation for which a match of the respective descriptors exists in each case.

This can achieve the technical advantage that the positioning of the map representation in the semantic road map can be made more precise by taking into account the feature associations between features of characteristic elements of the semantic road map and of the map representation.

According to a second aspect of the present invention, a method for supplementing a semantic road map with information of a map representation of an environment of a vehicle is provided, comprising:

performing the method for positioning a map representation of an environment of a vehicle in a semantic road map according to one of the preceding embodiments; and integrating information of the map representation into the ascertained portion of the semantic road map.

This can achieve the technical advantage that an improved method for supplementing a semantic road map with information of a map representation of an environment of a vehicle is provided, which includes the improved method for positioning a map representation of an environment of a vehicle in a semantic road map with the technical advantages mentioned above.

According to a third aspect of the present invention, a computing unit configured to perform the method for positioning a map representation of an environment of a vehicle in a semantic road map according to one of the preceding embodiments and/or the method for supplementing a semantic road map with information of a map representation of an environment of a vehicle is provided.

According to a fourth aspect of the present invention, a computer program product is provided, comprising instructions which, when the program is executed by a data processing unit, cause the data processing unit to perform the method for positioning a map representation of an environment of a vehicle in a semantic road map according to one of the preceding embodiments and/or the method for supplementing a semantic road map with information of a map representation of an environment of a vehicle.

Exemplary embodiments of the present invention are explained with reference to the figures.

BRIEF DESCRIPTION OF THE DRAWINGS

FIG. 5 shows a flow chart of a method for positioning a map representation of an environment of a vehicle in a semantic road map, according to an example embodiment of the present invention.

DETAILED DESCRIPTION OF EXAMPLE EMBODIMENTS

Figure 1:
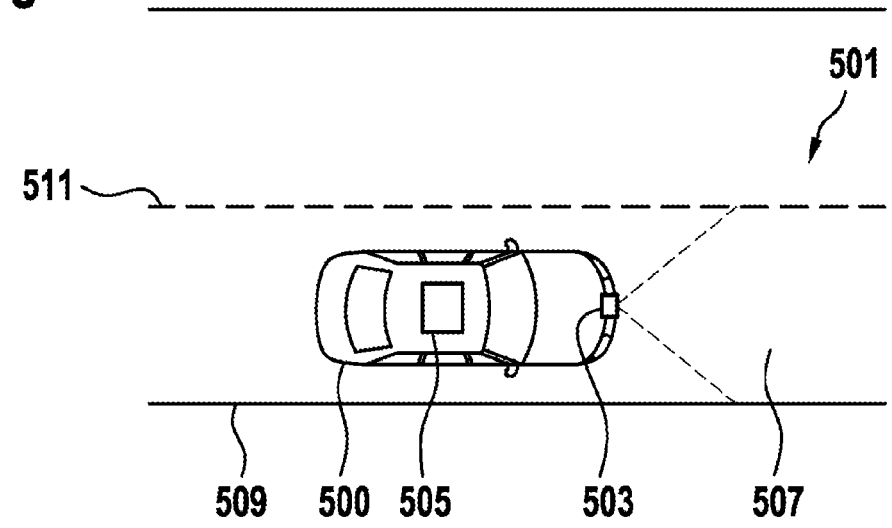
FIG. 1 shows a schematic representation of a vehicle comprising a computing unit for performing the method for positioning a map representation of an environment of a vehicle in a semantic road map, according to an example embodiment of the present invention.

FIG. 1 shows a schematic representation of a vehicle 500 comprising a computing unit 505 for performing the method 100 for positioning a map representation 200 of an environment 501 of a vehicle 500 in a semantic road map 300.

FIG. 1 shows a vehicle 500 on a roadway 507 with roadway boundaries 509 and roadway markings 511. The vehicle 500 comprises at least one environmental sensor 503 and a computing unit 505. Via the environmental sensor 503, the vehicle 500 is capable of recording environmental sensor data of the environment 501 surrounding the vehicle 500. The computing unit 505 is configured to carry out the method according to the present invention for positioning a map representation of an environment of a vehicle in a semantic road map. The computing unit 505 may furthermore be configured to perform the method according to the present invention for supplementing a semantic road map with information of a map representation of an environment of a vehicle. For this purpose, the semantic road map can be stored in the computing unit 505, for example in a corresponding memory device.

Figure 2:
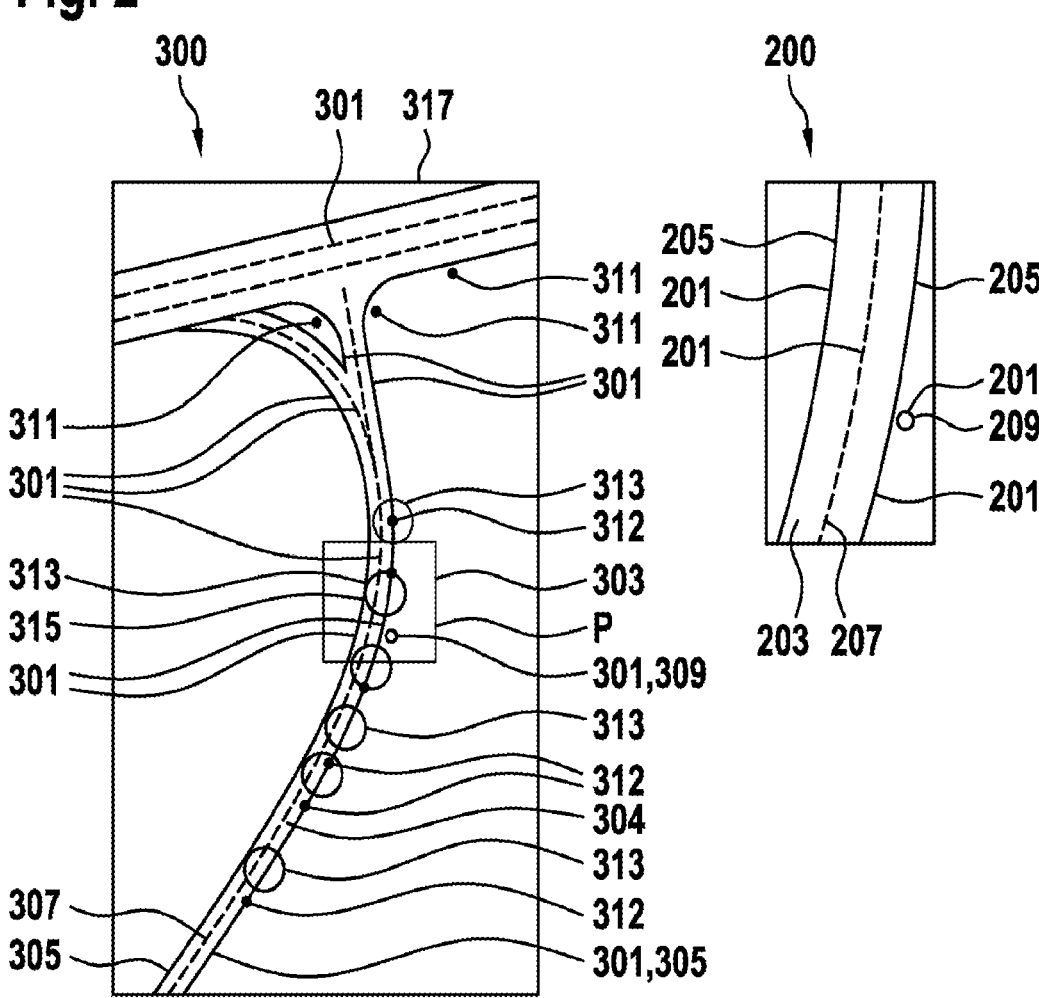
FIG. 2 shows a schematic representation of a semantic road map and of a map representation of an environment of a vehicle, according to an example embodiment of the present invention.

FIG. 2 shows a schematic representation of a semantic road map 300 and of a map representation 200 of an environment 501 of a vehicle 500.

FIG. 2 shows a map representation 200 of an environment of a vehicle, analogous to the vehicle 500 shown in FIG. 1. The map representation 200 is based on environmental sensor data of an environmental sensor 503 of a vehicle 500 that were recorded of the respective environment 501 surrounding the vehicle 500, during driving of the vehicle 500. In the embodiment shown, the map representation 200 includes a roadway 203 with roadway boundaries 205 and roadway markings 207. The map representation 200 furthermore shows a street light 209, which is arranged at the edge of the roadway 203.

FIG. 2 furthermore shows a semantic road map 300. The semantic road map also shows a roadway 304 with a roadway boundary 305 and roadway markings 307. The semantic road map 300 shows a larger section of the environment in comparison to the map representation 200. The semantic road map thus shows a plurality of different objects arranged along the roadway 304, for example, street lights 309 or traffic lights 311.

For positioning the map representation 200 in the semantic road map 300 according to the method according to the present invention, characteristic elements 201 in the map representation 200 are determined first. The characteristic elements 201 may, for example, be provided by the roadway boundaries 205, the roadway marking 207, or the street light 209. Furthermore, corresponding characteristic elements 301 in the semantic road map 300 are determined. The characteristic elements 301 may also be provided by the road boundary 305, the roadway marking 307, the street lights 309, or the traffic lights 311.

The ascertained characteristic elements 201 of the map representation 200 are subsequently compared to the ascertained characteristic elements 301 of the semantic road map. By comparing the characteristic elements 201 of the map representation 200 to the characteristic elements 301 of the semantic road map 300, a portion 303 in the semantic road map 300 is ascertained. The ascertained portion 303 is characterized in that the characteristic elements 301 arranged in the ascertained portion 303 at least partially match the characteristic elements 201 of the map representation 200. The portion 303 determined in this way thus includes at least one characteristic element 301 that matches a characteristic element 201 of the map representation 200. A match of characteristic elements may in this case be given in that the respective characteristic elements are of a same semantic class and are arranged at comparable positions within the map representation 200 and within the semantic road map 300.

For determining the position of the map representation 200 in the semantic road map 300, a position P of the portion 303 in the semantic road map 300 is subsequently identified as the positioning of the map representation 200 in the semantic road map 300. The thus ascertained position P of the map representation 200 in the semantic road map 300 is to be interpreted such that the portion 303 ascertained by the comparison of the characteristic elements 201, 203 represents the environment 501 of the vehicle 500 that is depicted by the map representation 200.

For comparing the characteristic elements 201 of the map representation 200 to the characteristic elements 301 of the semantic road map 300, descriptors for key locations of each characteristic element 301 of the semantic road map 300 and for key locations of each characteristic element 201 of the map representation 200 can be ascertained and compared to one another. For this purpose, the descriptors may be designed as neighbor binary landmark descriptors. For this purpose, a grid structure with several spatial regions is ascertained for each key location and a value of a property of the characteristic element respectively taken into account is ascertained for each spatial region of the grid structure. For creating the descriptor, for the plurality of spatial regions in the grid structure, the respectively ascertained values of the property are compared to one another and a spatial region of the grid structure in which the property of the respectively characteristic element has a greater value than in the directly adjacent spatial regions is assigned a numerical value 1, while a numerical value 0 is accordingly assigned to the other spatial regions. The resulting vectors can be compared to one another for any characteristic elements of the map representation 200 or of the semantic road map 300.

For the comparison, an averaging of the descriptors for characteristic elements of a semantic class can in particular be carried out. Averaging may, for example, be brought about by forming a weighted average of the plurality of descriptors of the plurality of characteristic elements of a semantic class.

For comparing the various descriptors, a next neighbor search for the descriptors can be performed on a k-dimensional tree.

For comparing the descriptors of the various characteristic elements 201, 301, the characteristic elements 201, 301 can be taken into account with respect to their semantic class so that only descriptors of characteristic elements 201, 301 of the descriptors whose characteristic elements are assigned to the same semantic class are compared. Alternatively, as described above, an average descriptor may be used for the plurality of characteristic elements of a semantic class so that the same averaged descriptor is used for each element of the same class. The semantic class can be given by the objects described above, such as the road boundary 305, the roadway marking 307, the street lights 309, or the traffic lights 311. Key locations for which the calculation of the descriptions is carried out can be any point of a characteristic element within the map representation 200 or within the semantic road map 300.

For comparing the characteristic elements 201, 301 or the respective descriptors, a rotation of the map representation 200 relative to the semantic road map 300 can be performed. The rotation can bring the map representation and the semantic road map 300 into an identical orientation so that a precise comparison of the descriptors of the key locations of the characteristic elements 201, 301 to be compared and thus a precise positioning of the map representation 200 within the semantic road map 300 can take place.

The rotation of the map representation 200 relative to the semantic road map 300 can be carried out on the basis of a major axis or an average line direction of the map representation 200 and of the semantic road map 300 around a center of a cluster 312 of a corresponding position hypothesis 313.

Due to the high periodicity of courses of roads with respect to the road boundaries or road markings or with respect to the arrangement of street light poles or traffic lights, an increased number of possible positions of the road portion, depicted by the map representation 200, within the semantic road map 300 may exist as a function of the road portion depicted by the map representation 200. As a result, a plurality of possible position hypotheses can be formulated, which, as a function of the characteristic elements 201 of the map representation 200, represent the correct position of the road portion, depicted by the map representation 200, within the semantic road map 300 with different probabilities.

For determining the position of the map representation 200 in the semantic road map 300, several position hypotheses are created. For this purpose, for the characteristic elements 301 of the semantic road map 300 for which a match of the descriptors to the descriptors of characteristic elements 201 of the map representation 200 has been ascertained, a position displacement of the key locations by a displacement distance corresponding to a distance of the respective key locations of the characteristic elements 201 of the map representation 200 from a center point of the map representation 200 can be performed. The clusters 312 formed thereby of displaced key locations within the semantic road map 300 can be interpreted as position hypothesis 313 below. In this respect, a geometric verification of the position hypotheses can take place by performing a RANSAC algorithm. For determining the actual position of the map representation 200 within the semantic road map 300 on the basis of the created position hypotheses 313, the position hypothesis 315 that is based on a point cluster 312 with the highest point density is ascertained on the basis of a point density of the individual clusters 312 of displaced key locations. In this case, the point density of the respective cluster 312 corresponds to the number of displaced key locations of the characteristic elements 301 that respectively match characteristic elements 201 of the map representation 200. The point cluster 312 with the highest point density and the position hypothesis 315 based thereon thus correspond to the portion 303 within the semantic road map in which is arranged the largest number of characteristic elements 301 that match characteristic elements 201 of the map representation 200. The position hypothesis 315 ascertained in this way thus represents the correct position of the map representation within the semantic road map 300 with the greatest probability.

Alternatively, the actual position of the map representation 200 within the semantic road map 300 can be ascertained on the basis of the plurality of position hypotheses 313 in that, for each position hypothesis, a transformation of the map representation 200 into the semantic road map 300 and a verification of the match of the thus transformed map representation 200 to the respective portion 303 of the position hypothesis 313 of the semantic road map 300 are performed.

For determining the position of the map representation 200 within the semantic road map 300, all characteristic elements 201 of the map representation 200 and all characteristic elements 301 of the semantic road map can be taken into account. For limiting the number of the characteristic elements 301 to be taken into account in the semantic road map 300, a pre-positioning of the map representation 200 within the semantic road map 300 can be performed. For this purpose, on the basis of a geoposition of the environment 501 represented by the environmental sensor data of the vehicle 500 and described in the map representation 300, a partial portion 317 of the semantic road map 300 that includes the geoposition of the environment 501 can be ascertained. The geoposition may, for example, be determined on the basis of data of a global navigation satellite system GNSS indicating the geoposition of the vehicle 501 at a time when the environmental sensor data on the basis of which the map representation 200 is generated were received. By taking into account the geoposition, the position of the map representation 200 within the semantic road map 300 can be pre-positioned to an accuracy of approximately 50 meters. For the exact determination of the position of the map representation 200 within the road map 300 by comparing the characteristic elements 201, 301, only the characteristic elements 301 arranged within the partial portion 317, determined by the pre-positioning, of the semantic road map 300 are thus taken into account for the semantic road map 300.

Figure 3:
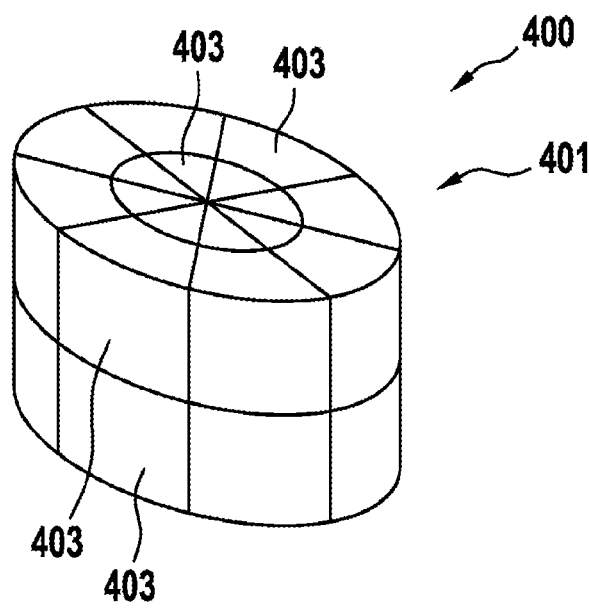
FIG. 3 shows a schematic representation of a descriptor, according to an example embodiment of the present invention.

FIG. 3 shows a schematic representation of a descriptor 400.

The descriptor 400 shown is designed as a neighbor binary landmark descriptor and comprises a grid structure 401 with a plurality of spatial regions 403. In the embodiment shown, the grid structure 401 is cylindrical with a circular base area. The spatial regions 403 are arranged in the radial and azimuthal direction as well as in the longitudinal direction of the cylindrical grid structure 401. The three-dimensional design of the descriptor 400 makes a three-dimensional consideration of the characteristic elements 201, 301 of the three-dimensional map representation 200 or of the three-dimensional semantic road map 300 possible.

Figure 4:
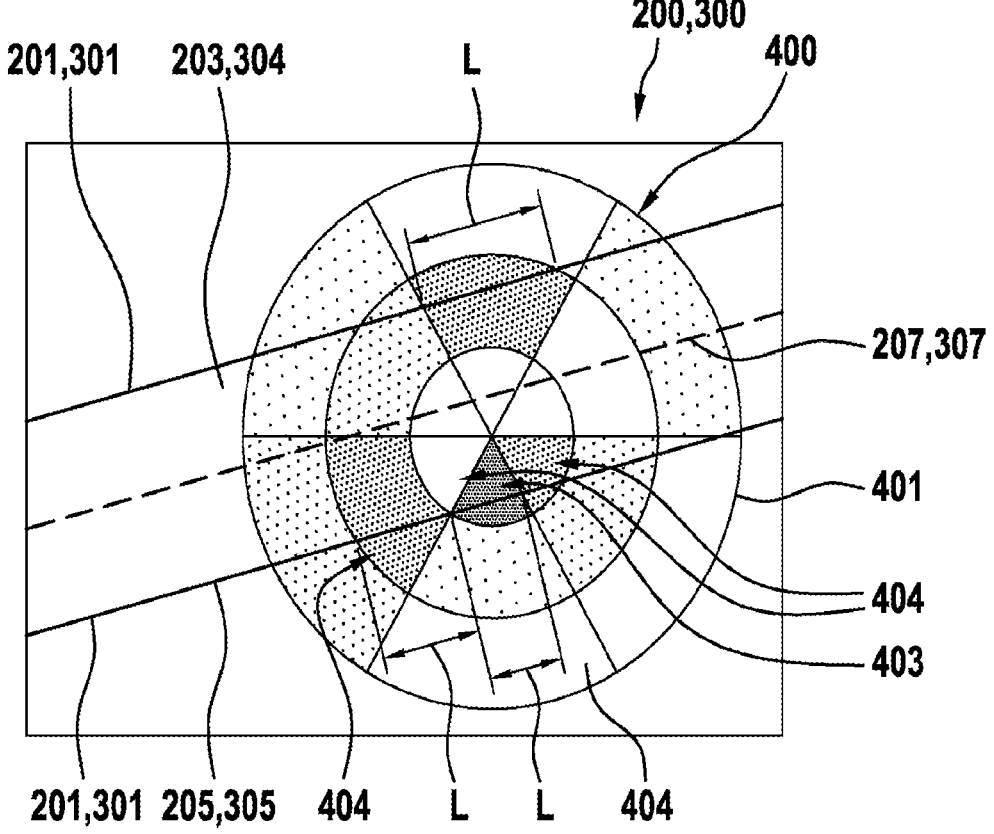
FIG. 4 shows a schematic representation of a descriptor applied to a semantic road map or to a map representation, according to an example embodiment of the present invention.

FIG. 4 shows a schematic representation of a descriptor 400 applied to a semantic road map 300 or to a map representation 200.

In the plan view shown, a descriptor 400 according to the embodiment in FIG. 3 is shown, which is positioned over a roadway 203, 304 with corresponding roadway boundaries 205, 305 and roadway markings 207, 307. For calculating the descriptor 400, values of a property of the characteristic elements 201, 301 taken into account are calculated for each spatial region 403 of the grid structure 401. In the embodiment shown, the road boundary 205, 305 and roadway markings 207, 307 are taken into account as characteristic elements 201, 301. Since these characteristic elements 201, 301 each have a line shape, a length L that the respective characteristic element 201, 301 assumes in the respective spatial region 403, 404 to be considered is taken into account as the property of the respective characteristic element 201, 301 to be taken into account.

As mentioned above, the descriptors can be calculated separately for various semantic classes of the characteristic elements 201, 301. Thus, in the case shown, the descriptor 400 for only the road markings 207, 307 or for only the road boundary 205, 305 can be calculated. The consideration of the semantic classes of the characteristic elements 201, 301 in the calculation of the descriptor 400 is represented by the different hatching of the various spatial regions 403, 404. For calculating the descriptor 400, the spatial regions 403, 404, and in particular the therein assumed values of the properties of the characteristic elements 201, 301 taken into account, are compared to one another. The spatial region 404 having a value of the considered property of the characteristic element 201, 301 that is greater than the values of the spatial region 403 directly adjacent to the respective spatial region 404 is provided with a numerical value 1. On the other hand, the respectively other spatial regions 403 having values of the properties of the characteristic elements 201, 301 that are not greater than the values of the respectively directly adjacent spatial regions 403 are provided with a numerical value of 0. The descriptor 400 determined in this way can thus be represented in a binary vector representation.

FIG. 5 shows a flow chart of a method 100 for positioning a map representation 200 of an environment 501 of a vehicle 500 in a semantic road map 300.

For positioning the map representation 200 of the environment 501 of the vehicle 500 in the semantic road map 300, environmental sensor data of at least one environmental sensor 503 of the vehicle 500 are recorded first in a method step 101. The environmental sensor data here represent the environment 501 of the vehicle 500. The environmental sensor data may, for example, comprise camera data, lidar data, or radar data.

In a further method step 103, a map representation 200 of the environment 501 of the vehicle 500 is created on the basis of the received environmental sensor data. The map representation 200 can in this case be designed as a digital three-dimensional map of an environment 501 of the vehicle 500 and can represent the environment 501 of the vehicle 500 within a range of the at least one environmental sensor 503.

In a further method step 139, a pre-positioning of the map representation 200 relative to the semantic road map 300 is performed. The pre-positioning is in this case performed on the basis of a geoposition of the environment 501 of the vehicle 500 that is depicted by the map representation 200. The geoposition may be based on data of a global navigation satellite system GNSS that were received at a time when the environmental sensor data on which the map representation 200 is based were received.

In a further method step 141, a partial portion 317 is ascertained on the basis of the pre-positioning of the map representation 200 in the semantic road map 300. The partial portion 317 includes the geoposition of the map representation 200.

In a further method step 105, characteristic elements 201, 301 are respectively ascertained in the map representation 200 and in the semantic road map 300. The characteristic elements 201, 301 may be provided by objects within the environment 501 that are represented within the map representation 200 or within the semantic road map 300. The characteristic elements 201, 301 may, for example, be provided by roadway boundaries 205, 305, roadway markings 207, 307, street lights 209, 309, or traffic lights 311.

In a further method step 107, the characteristic elements 201 of the map representation 200 are compared to the characteristic elements 301 of the semantic road map 300.

For this purpose, in a further method step 113, descriptors 400 for support locations of each characteristic element 201 of the map representation 200 and for support locations of each characteristic element 301 within the partial portion 317 of the semantic road map 300 are ascertained.

For this purpose, a grid structure 401 with a plurality of spatial regions 403 is ascertained for each support location in a method step 117.

In a further method step 119, a value of a property of the respectively considered characteristic element 201, 301 is ascertained for each spatial region 403 of the grid structure 401. The property of the characteristic elements 201, 301 taken into account may, for example, be a point density of a puntiform characteristic element 201, 301, a length of a linear characteristic element 201, 301, a surface area of a surface-shaped characteristic element, or a volume of a three-dimensional characteristic element 201, 301.

In a further method step 121, the values of the properties of the characteristic elements 201, 301 of the individual spatial regions 403 of the grid structure 401 of the descriptor 400 are compared to values that the respective properties assume in directly adjacent spatial regions 403 of the grid structure 401 of the descriptor 400.

On the basis thereof, in a further method step 123, each spatial region 403, 404 in which the respectively considered property assumes a value that is greater than a value of the property in directly adjacent spatial regions 403, 404 is assigned a numerical value of 1, while a spatial region 403, 404 in which the property has a value that is not greater than the values of the property in directly adjacent spatial regions is assigned a numerical value of 0. The descriptor 400 can thus be represented in a binary vector representation.

In a further method step 115, the thus ascertained descriptors 400 of the various characteristic elements 201, 203 are compared to one another. The comparison of the descriptors 400 of the various characteristic elements 201, 301 can be performed in such a way that only descriptors of characteristic elements 201, 301 assigned to the same semantic class are compared. For example, only descriptors 400 of roadway boundaries 205, 305 may thus be compared to one another. As described above, a common averaged descriptor per semantic class can be used for all characteristic elements of the semantic class.

For comparing the descriptors 400 of the plurality of characteristic elements 201, 301, a next neighbor search for descriptors 400 is carried out on a k-dimensional tree in a further method step 125.

In a further method step 109, a portion 303 within the partial portion 317 of the semantic road map 300 is ascertained; arranged in portion 303 is at least one characteristic element 301 that matches at least one characteristic element 201 of the map representation 200.

For determining the portion 303, position hypotheses 313 are formulated as possible positions of the map representation 200 within the semantic road map 300 in a further method step 127.

For this purpose, in a method step 129, key locations of the characteristic elements 301 of the semantic road map 300 whose descriptors 400 match descriptors 400 of characteristic elements 201 of the map representation 200 are displaced within the semantic road map 300 by distances corresponding to distances that the respective characteristic elements 201 of the map representation 200 are from a center of the map representation. By displacing the key locations of the characteristic elements 301 of the semantic road map 300, clusters 312 of support locations of the characteristic elements 301 are formed within the partial portion 317 of the semantic road map 300.

In a further method step 131, the thus formed clusters 312 are identified as position hypotheses 313 for the map representation 200 within the semantic road map 300.

In a further method step 133, clusters 312 of displaced key locations with a highest point density of key locations within the cluster 312 are ascertained, and the respective cluster 312 is identified as the position hypothesis 313 with the greatest probability of the actual position of the map representation 200 within the semantic road map 300.

In a further method step 135, the position hypotheses 313 are geometrically verified by performing a RANSAC algorithm.

In a further method step 137, the position hypothesis 315 with the most inlier values is identified as the position P of the map representation 200; the inlier values of the position hypothesis 315 correspond in this case to the number of characteristic elements 301 within the portion 303 defined by the position hypothesis 315 that correspond to the characteristic elements 201 of the map representation 200.

Thereafter, in a further method step 111, the position P of the portion 303 within the semantic road map 300 that corresponds to the portion 303, defined by the position hypothesis 315 with the most matches of the characteristic elements 301 is identified as the position of the map representation 200 within the semantic road map 300.

In a further method step 143, feature associations between features of characteristic elements 301 of the semantic road map 300 and features of characteristic elements 201 of the map representation 200 that match the respective characteristic elements 301 of the semantic road map 300 are furthermore formed.

Figure 6:
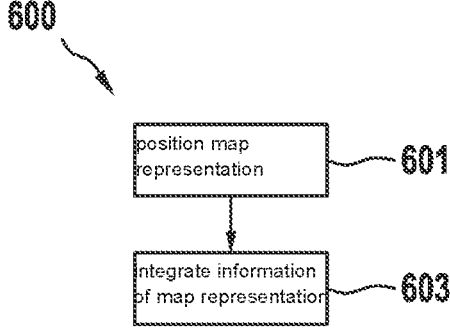
FIG. 6 shows a flow chart of a method for supplementing a semantic road map with information of a map representation of an environment of a vehicle, according to an example embodiment of the present invention.

FIG. 6 shows a flow chart of a method 600 for supplementing a semantic road map 300 with information of a map representation 200 of an environment 501 of a vehicle 500.

For supplementing a semantic road map 300 with information of a map representation 200 of an environment 501 of a vehicle 500, the method 100 according to the present invention for positioning a map representation 200 of an environment 501 of a vehicle 500 in a semantic road map 300 according to the embodiments described above is performed first in a method step 601.

Thereafter, in a method step 603, the information of the map representation 200 is integrated into the ascertained portion 303 of the semantic road map 300.

Figure 7:
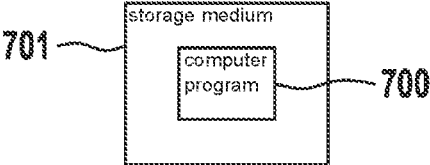
FIG. 7 shows a schematic representation of a computer program product, according to an example embodiment of the present invention.

FIG. 7 shows a schematic representation of a computer program product 700, comprising instructions which, when the program is executed by a computing unit, cause the computing unit to perform the method 100 for positioning a map representation 200 of an environment 501 of a vehicle 500 in a semantic road map 300 and/or the method 600 for supplementing a semantic road map 300 with information of a map representation 200 of an environment 501 of a vehicle 500.

In the embodiment shown, the computer program product 700 is stored on a storage medium 701. The storage medium 701 can in this case be any storage medium from the related art.

The invention claimed is:

1. A method for supplementing a semantic road map with information of a map representation of an environment of a vehicle, comprising:

performing a method for positioning a map representation of the environment of the vehicle in the semantic road map, including:

receiving environmental sensor data of at least one environmental sensor of the vehicle, creating a map representation of an environment of the vehicle based on the environmental sensor data of the vehicle, ascertaining characteristic elements in the map representation and characteristic elements in a semantic road map representing the environment;

comparing the characteristic elements of the map representation to the characteristic elements of the semantic road map, performing a pre-positioning of the map representation relative to the semantic road map based on a geoposition of the environment of the vehicle that is depicted by the map representation, ascertaining a partial portion of the semantic road map based on the geoposition, wherein the characteristic elements of the semantic road map within the partial portion are determined, ascertaining a portion of the semantic road map for which at least one characteristic element of the portion of the semantic road map matches at least one characteristic element of the map representation and for which the map representation and the semantic road map describe an identical region of the environment of the vehicle, and identifying a position of the portion within the semantic road map as the position of the map representation in the semantic road map; and integrating information of the map representation into the identified portion of the semantic road map.

2. A computing unit configured to position a map representation of an environment of a vehicle in a semantic road map, the computing unit configured to:

receive environmental sensor data of at least one environmental sensor of the vehicle;

create a map representation of an environment of the vehicle based on the environmental sensor data of the vehicle;

ascertain characteristic elements in the map representation and characteristic elements in a semantic road map representing the environment;

compare the characteristic elements of the map representation to the characteristic elements of the semantic road map;

perform a pre-positioning of the map representation relative to the semantic road map based on a geoposition of the environment of the vehicle that is depicted by the map representation;

ascertain a partial portion of the semantic road map based on the ascertained geoposition, wherein the characteristic elements of the semantic road map within the partial portion are determined;

ascertain a portion of the semantic road map for which at least one characteristic element of the portion of the semantic road map matches at least one characteristic element of the map representation and for which the map representation and the semantic road map describe an identical region of the environment of the vehicle;

identify a position of the portion within the semantic road map as the position of the map representation in the semantic road map; and integrate information of the map representation into the identified portion of the semantic road map.

3. A non-transitory computer-readable medium on which is stored a computer program including instructions positioning a map representation of an environment of a vehicle in a semantic road map, the instructions, when executed by a data processor, causing the data processor to perform the following steps:

receiving environmental sensor data of at least one environmental sensor of the vehicle;

creating a map representation of an environment of the vehicle based on the environmental sensor data of the vehicle;

ascertaining characteristic elements in the map representation and characteristic elements in a semantic road map representing the environment;

comparing the characteristic elements of the map representation to the characteristic elements of the semantic road map;

performing a pre-positioning of the map representation relative to the semantic road map based on a geoposition of the environment of the vehicle that is depicted by the map representation;

ascertaining a partial portion of the semantic road map based on the ascertained geoposition, wherein the characteristic elements of the semantic road map with in the partial portion are determined;

ascertaining a portion of the semantic road map for which at least one characteristic element of the portion of the semantic road map matches at least one characteristic element of the map representation and for which the map representation and the semantic road map describe an identical region of the environment of the vehicle;

identifying a position of the portion within the semantic road map as the position of the map representation in the semantic road map; and integrating information of the map representation into the identified portion of the semantic road map.

4. The method according to claim 1, wherein the comparing of the characteristic elements includes:

ascertaining descriptors for key locations of each characteristic element of the semantic road map and descriptors for key locations of each characteristic element of the map representation; and comparing the descriptors of the key locations of the characteristic elements of the semantic road map to the descriptors of the key locations of the characteristic elements of the map representation, wherein characteristic elements match when descriptors of the key locations of the respective elements match.

5. The method according to claim 4, wherein the ascertaining of the descriptors of each characteristic element includes, for each descriptor:

determining a geometric grid structure of the descriptor at a position of the key location of the respective characteristic element within the map representation or within the semantic road map, wherein the geometric grid structure includes a plurality of adjacent spatial regions;

ascertaining, for each spatial region of the grid structure, a property of the respective characteristic element;

comparing values of the properties within a spatial region to values of the property for spatial regions of the geometric structure that are directly adjacent to the spatial region; and assigning a numerical value 1 to a spatial region of the grid structure when the value of the property in the respective spatial region is greater than values of the property in directly adjacent spatial regions, and assigning a numerical value 0 to a spatial region when the value of the property in the spatial regions is not greater than values of the property in the directly adjacent spatial regions.

6. The method according to claim 4, wherein the comparing of the descriptors includes:

performing a next neighbor search for the descriptors on a k-dimensional tree.

7. The method according to claim 4, wherein the descriptors are determined for characteristic elements of various semantic classes, and wherein only descriptors of characteristic elements of a same semantic class are compared to one another.

8. The method according to claim 7, wherein the semantic classes of the characteristic elements include: roadway markings, roadway boundaries, street lights, traffic lights, traffic signs.

9. The method according to claim 5, wherein the property is one from the following list: a point density of points within the spatial region, a length of a characteristic element depicted as a line within the spatial region, a surface area of a characteristic element depicted as a surface within the spatial region, a volume of a characteristic element depicted as a volume within the spatial region.

10. The method according to claim 4, wherein the ascertaining of the portion includes:

formulating a plurality of position hypotheses of possible positions of the map representation within the semantic road map, wherein the formulating of the position hypotheses includes:

performing a position translation of the key locations of the characteristic elements in the semantic road map whose descriptors match descriptors of characteristic elements of the map representation, within the semantic road map by distances corresponding to distances in the map representation of the respectively corresponding characteristic elements of the map representation from a center point of the map representation;

identifying positions of the clusters as position hypotheses for the map representation; and verifying the position hypotheses as the position of the portion; wherein the verifying includes:

ascertaining numbers of key locations displaced to centers of the clusters, and identifying a cluster with a largest number of key locations displaced to the center of the cluster, as the position hypothesis of the portion with a greatest match to the map representation, or representing the map representation in the semantic road map according to the position hypotheses, comparing the characteristic elements at the position of the position hypothesis to the characteristic elements of the map representation represented at the position of the position hypothesis, and identifying the position hypothesis with a largest number of matching characteristic elements.

11. The method according to claim 10, wherein comparing the characteristic elements at the position of the position hypothesis to the characteristic elements of the map representation represented at the position of the position hypothesis includes performing a random sample consensus (RANSAC) algorithm.

12. The method according to claim 1, further comprising:

forming feature associations between features of characteristic elements of the semantic road map and features of characteristic elements of the map representation for which a match of the respective descriptors exists in each case.

* * * * *